(12) United States Patent
Yamashita et al.

(10) Patent No.: US 8,017,101 B2
(45) Date of Patent: Sep. 13, 2011

(54) PRECIPITATED CALCIUM CARBONATE, METHOD FOR PRODUCING THE SAME AND FILLER FOR LOADING PAPER USING THE SAME

(75) Inventors: Kazuo Yamashita, Tachikawa (JP); Kazuhisa Shimono, Tachikawa (JP); Toru Kawazu, Tachikawa (JP); Tatsuo Takano, Tachikawa (JP)

(73) Assignee: Okutama Kogyo Co., Ltd., Tokyo (JP)

( * ) Notice: Subject to any disclaimer, the term of this patent is extended or adjusted under 35 U.S.C. 154(b) by 1247 days.

(21) Appl. No.: 10/556,934

(22) PCT Filed: Jun. 3, 2004

(86) PCT No.: PCT/JP2004/007709
§ 371 (c)(1),
(2), (4) Date: Jan. 11, 2007

(87) PCT Pub. No.: WO2004/108597
PCT Pub. Date: Dec. 16, 2004

(65) Prior Publication Data
US 2007/0169905 A1    Jul. 26, 2007

(30) Foreign Application Priority Data
Jun. 5, 2003    (JP) .................................. 2003-161141

(51) Int. Cl.
*C01F 11/18*    (2006.01)
*C09C 1/02*    (2006.01)
(52) U.S. Cl. ...................... 423/430; 106/464; 423/432
(58) Field of Classification Search ................ 162/158, 162/181.2; 423/430, 432
See application file for complete search history.

(56) References Cited

U.S. PATENT DOCUMENTS

| | | | | |
|---|---|---|---|---|
| 5,292,495 A | * | 3/1994 | Nakajima et al. | 423/432 |
| 6,991,677 B2 | * | 1/2006 | Tanabe et al. | 106/436 |
| 2008/0261021 A1 | * | 10/2008 | Haenen et al. | 428/319.1 |

FOREIGN PATENT DOCUMENTS

| | | | |
|---|---|---|---|
| JP | 10072215 | * | 3/1998 |
| JP | 10-310996 | * | 11/1998 |
| JP | 2000-212892 | * | 8/2000 |

OTHER PUBLICATIONS

English Translation of Abstract and Claims/Specification of JP10-310996.*
English Translation of Abstract and Claims/Specification of JP2000-212892.*

* cited by examiner

*Primary Examiner* — Melvin Mayes
*Assistant Examiner* — Colin W Slifka
(74) *Attorney, Agent, or Firm* — Bacon & Thomas, PLLC

(57) ABSTRACT

Carbon dioxide containing gas is blown into a calcium hydroxide slurry having a calcium hydroxide concentration of 100 to 400 g/L obtained by wet slaking calcined lime with 4 N hydrochloric acid activity (value at 3 minutes) of 150 to 400 mL to allow them to react until the carbonation rate becomes 50 to 85%, then 1 to 20% by volume of the calcium hydroxide slurry is added, and carbon dioxide containing gas is further blown in to terminate the reaction. The calcium carbonate obtained by this method is precipitated calcium carbonate aggregates having a secondary particle diameter of 1 to 10 μm and consisting of primary particles having a long diameter of 0.5 to 3.0 μm, a short diameter of 0.1 to 1.0 μm and an aspect ratio of 3 or more, has superior characteristics due to a BET specific surface area in the range of 8 to 20 $m^2/g$ and a pore volume in the range of 1.5 to 3.5 $cm^3/g$, can be uniformly dispersed in pulp fiber, and thereby can be used to manufacture high bulk paper.

5 Claims, No Drawings

PRECIPITATED CALCIUM CARBONATE, METHOD FOR PRODUCING THE SAME AND FILLER FOR LOADING PAPER USING THE SAME

TECHNICAL FIELD

The present invention relates to precipitated calcium carbonate suitable as a filler for loading paper and a method for producing the same. Specifically, the present invention relates to calcium carbonate aggregates suitable for production of high bulk loaded paper.

Conventionally, inorganic fillers such as kaolin, talc and calcium carbonate have been used as fillers for papermaking to improve brightness, opacity and printability of paper. With the neutralization of paper, precipitated calcium carbonate, in particular, is being more widely used, and calcium carbonate products having a controlled particle shape, diameter and so forth have been developed to improve optical characteristics such as brightness and opacity as well as printability when they are used. Further, in recent years, high bulk is required to make paper lighter in addition to other physical properties such as optical characteristics and surface strength of paper. To increase the bulk of paper stock principally has been proposed as a technique for increasing the bulk of paper, and examples thereof include paper in which pulp, which is raw material, itself is made bulky, paper in which a pulp fiber sheet is treated with liquid ammonia to make paper bulky, paper made by using pulp with foamed particles and so forth. Although the number is limited, attempts have been made to improve the bulk of paper by improving fillers included in paper.

For example, Patent document 1 discloses bulky neutral paper using hollow spherical vaterite type calcium carbonate having a particle diameter of 0.5 to 30 μm as a filler and shows that such hollow spherical vaterite type calcium carbonate is produced by allowing calcium chloride and sodium carbonate to react in the presence of pentanol (hereinafter, referred to as Prior art 1).

Further, Patent document 2 discloses a mineral pigment composition with mineral particles flocculated by adding a high molecular weight carboxyl containing polymer or copolymer to a slurry containing mineral particles such as kaolin, calcium carbonate and titanium dioxide. It is disclosed that this mineral pigment composition has high bulk, and preferably has a pore volume of 0.50 to 1.10 $cm^3/g$ and imparts as a filler high light scattering and opacity to paper (hereinafter, referred to as Prior art 2). Further, the applicants of the present invention have also proposed a calcium carbonate aggregate having an average particle diameter 1.5 to 10 μm formed by calcium carbonate particles having a primary particle diameter of 0.05 to 0.5 μm as a precipitated calcium carbonate aggregate suitable as a papermaking pigment and a method for producing the same (Patent document 3) (hereinafter, referred to as Prior art 3).

[Patent document 1] Japanese Patent Laid-Open Publication No. 3-124895
[Patent document 2] Japanese Patent Laid-Open Publication No. 7-503027
[Patent document 3] Japanese Patent Laid-Open Publication No. 3-14696

However, the Prior arts 1 and 2 suffer problems that, since organic matter such as pentanol and carboxyl containing polymer are required to produce calcium carbonate, it is hard to apply these techniques to a common calcium carbonate producing apparatus which blows carbon dioxide containing gas into the calcium hydroxide slurry to produce precipitated calcium carbonate, and the producing cost is high. On the other hand, a calcium carbonate aggregate having stable quality can be manufactured with a common calcium carbonate producing apparatus by the method of the Prior art 3. However, since the manufactured calcium carbonate aggregate contains cubic particles as primary particles, it suffers problems such as high density and a small specific surface area calculated based on the Brunauer, Emmett and Teller (BET) technique.

Accordingly, an object of the present invention is to provide a calcium carbonate aggregate which can be manufactured by the precipitation method, contains spindle-shaped particles as primary particles, and have a large BET specific surface area and a large pore volume. Further, another object of the present invention is to provide a high bulk loaded paper by using the calcium carbonate aggregate.

DISCLOSURE OF THE INVENTION

To solve the foregoing problems in conventional techniques, the inventors of the present invention assiduously studied about the conditions under which precipitated calcium carbonate was manufactured by blowing carbon dioxide containing gas into a calcium hydroxide slurry. As a result, they found that a calcium carbonate aggregate containing uniformly flocculated primary particles having a long diameter of 0.5 to 3.0 μm, a short diameter of 0.1 to 1.0 μm and an aspect ratio of 3 or more can be obtained by using a high concentration calcium hydroxide slurry as raw material, and allowing a carbonation reaction to proceed in two stages under predetermined conditions, and that a calcium carbonate aggregate containing particles having such a shape exhibits extremely favorable dispersibility in pulp fiber and is effective for improving the bulk of paper, and thus accomplished the present invention.

That is, the precipitated calcium carbonate of the present invention is precipitated calcium carbonate having a diameter of 1 to 10 μm consisting of flocculated primary particles having a long diameter of 0.5 to 3.0 μm, a short diameter of 0.1 to 1.0 μm and an aspect ratio of 3 or more, wherein the BET specific surface area is in the range of 8 to 20 $m^2/g$, and the pore volume is in the range of 1.5 to 3.5 $cm^3/g$.

Further, the method for producing precipitated calcium carbonate of the present invention is characterized in that carbon dioxide or carbon dioxide containing gas is blown into a calcium hydroxide slurry having a calcium hydroxide concentration of 100 to 400 g/L obtained by wet slaking calcined lime having 4 N hydrochloric acid activity (value at 3 minutes) adjusted to 150 to 400 mL to allow them to react until the carbonation rate becomes 50 to 85%, then 1 to 20% by volume of the aforementioned calcium hydroxide slurry is added, and carbon dioxide or carbon dioxide containing gas is further blown in to terminate the reaction.

Further, the present invention provides a filler for loading paper containing such precipitated calcium carbonate and a loaded paper containing the same.

Hereafter, the precipitated calcium carbonate of the present invention and the method for producing the same will be explained in detail.

As calcined lime, which is raw material for manufacture of precipitated calcium carbonate, calcined lime in mass or powder obtained by baking limestone can be used, and, in particular, calcined lime whose 4 N hydrochloric acid activity at 3 minutes is adjusted to 150 to 400 mL, preferably 200 to 350 mL is used. The 4 N hydrochloric acid activity is a value measured by the coarse grain titration technique which is a reactivity test method, and is specifically represented by the consumption of 4 N hydrochloric acid (mL) over 3 minutes when 50 g of calcined lime particles having a diameter of 1 to 3 mm in 2 L of water are continuously titrated with 4 N hydrochloric acid at 40° C. When the 4 N hydrochloric acid activity at 3 minutes is less than 150 mL, the yield of calcium carbonate is low, and the grain size distribution tends to vary. When the value exceeds 400 mL, too high viscosity causes a transportation problem or a problem that temperature increases during the reaction and cooling is therefore required, among others.

A calcium hydroxide slurry is manufactured by wet slaking such calcined lime with water. At this time, the calcium hydroxide concentration in the slurry is made 100 to 400 g/L, preferably 150 to 200 g/L. By keeping the calcium hydroxide concentration in the calcium hydroxide slurry within such a high concentration range, production of cubic particles is suppressed, and crystals having a shape of spindle, rice grain or needle can be easily produced in the ensuing carbonation reaction. A partially carbonated calcium hydroxide slurry may be added at the initial stage of the reaction so that the particle diameter can be easily controlled. The partially carbonated calcium hydroxide slurry may be an aqueous suspension of colloidal calcium hydroxide particles with a carbonation rate of 10 to 50% and added preferably in an amount of 5 to 30% by weight based on the amount of calcium hydroxide. The partially carbonated calcium hydroxide slurry can be added at the initial stage of the reaction, specifically, until the carbonation rate becomes 50%.

The carbonation reaction consists of the first stage at which a reaction is performed until the carbonation rate becomes 50 to 85% and the second stage at which, after the first stage, the reaction is performed with further adding a calcium hydroxide slurry until the reaction is terminated. In the reaction at the first stage, carbon dioxide or carbon dioxide containing gas (hereinafter, collectively referred to as carbon dioxide containing gas) is blown into the aforementioned calcium hydroxide slurry having a relatively high concentration at a rate of 1 to 20 L/min, preferably 7 to 12 L/min based on the $CO_2$ amount to allow them to react at reaction start temperature 30 to 70° C., preferably 50 to 60° C. As the carbon dioxide containing gas, exhaust gas such as exhaust gas from a limestone incinerator, a power boiler and a refuse incinerator can be utilized, and gases with the carbon dioxide content of 15% or more are preferred. Thus, by performing the reaction at the first stage at a high calcium hydroxide concentration and relatively high temperature, reactivity of calcium hydroxide and carbon dioxide containing gas is increased, and numerous nuclei of calcium carbonate particles are produced at the first stage, facilitating the production of aggregated particles. The reaction at the first stage is performed until the carbonation rate becomes 50 to 85%. The carbonation rate is represented by % by weight of calcium carbonate based on a total of the weight of calcium hydroxide and that of calcium carbonate in the reaction mixture, and the termination point of the first stage can be determined, for example, by sampling the reaction mixture. When the carbonation rate is less than 50%, production of nuclei of the aggregates will be incomplete, and the aggregates are hardly produced. Further, when the carbonation rate exceeds 85%, the bond of the aggregate is weakened at the second stage, and the aggregates are easily broken in steps such as dispersion, coating and papermaking in the papermaking process in which a shearing force or the like is applied.

When the reaction at the first stage terminates, the aforementioned calcium hydroxide slurry is further added to the reaction mixture, and carbon dioxide gas is blown in to terminate the carbonation reaction. The reaction start temperature at the second stage is set at 55 to 65° C., and the amount of carbon dioxide gas blown in is set at 7 to 12 L/min. Further, the amount of the calcium hydroxide slurry to be added is made 1 to 20% of the reaction mixture, preferably 3 to 10%. Thus, by adding the calcium hydroxide slurry at the second stage, calcium carbonate crystals grow on nuclei of the aggregate produced at the first stage, and flocculent aggregates having a relatively uniform particle diameter, a large pore volume and robustness (hardly broken) can be produced.

The produced calcium carbonate aggregates are classified as required and dehydrated to produce powder. As a dehydration method, known mechanical dehydration methods such as centrifuge dehydration and pressure dehydration can be adopted.

The calcium carbonate obtained by the producing method of the present invention is flocculent aggregates having a secondary particle diameter of 1 to 10 μm and consisting of primary particles having a long diameter of 0.5 to 3.0 μm, a short diameter of 0.1 to 1.0 μm and an aspect ratio of 3 or more. These flocculent aggregates have a large surface area and a large pore volume. Specifically, the BET specific surface area is 8 to 20 $m^2/g$, and the pore volume measured by the mercury injection method is 1.5 to 3.5 $cm^3/g$. Preferably, the BET specific surface area is 10 to 15 $m^2/g$, and the pore volume is 1.8 to 2.5 $cm^3/g$.

Such calcium carbonate aggregates of the present invention can be used for a papermaking filler and other common inorganic pigments. Since the calcium carbonate aggregates can be uniformly dispersed and fixed particularly when they are added to pulp fiber and have characteristics such as high mechanical strength against a shearing force and high bulk, they are suitably used as a filler for loading paper.

The calcium carbonate of the present invention can be used in the same manner as conventional fillers for loading paper. For example, the loaded paper of the present invention can be obtained by adding 5 to 50 parts by weight of the calcium carbonate, preferably 10 to 30 parts by weight based on 100 parts by weight of the bone-dry weight of pulp material to a paper stock slurry containing pulp, thickener or the like and performing papermaking by a usual papermaking method. The loaded paper of the present invention has high bulk and superior paper strength achieved by using calcium carbonate aggregates having a large surface area and a large pore volume and favorable dispersibility as a filler for loading paper. Further, it also has superior optical characteristics such as brightness and opacity.

EXAMPLES

Hereafter, the examples of the method for producing calcium carbonate and the loaded paper of the present invention will be explained.

Example 1

Massive calcined lime having a hydrochloric acid activity (value at 3 minutes) of 300 mL was subjected to wet slaking with water to prepare a calcium hydroxide slurry having a calcium hydroxide concentration of 149 g/L. Subsequently, this calcium hydroxide slurry was placed in a reactor, and a reaction was performed at reaction start temperature of 55° C. with blowing in carbon dioxide containing gas ($CO_2$ concentration: 30%) at a rate of 10 L/min. When the carbonation rate became 75%, the supply of the carbon dioxide containing gas was discontinued to terminate the reaction, and the reaction mixture was added with 10% by weight of a calcium hydroxide slurry having a calcium hydroxide concentration of 100 g/L based on the amount of the reaction mixture.

After the addition of the calcium hydroxide slurry, a reaction at the second stage was performed at reaction start temperature of 61° C. with further blowing in carbon dioxide containing gas. After the reaction, dehydration and classification were performed to obtain calcium carbonate. When the shape of the calcium carbonate was observed by using an electron microscope, a laser particle size analyzer and an X-ray powder diffractometer, aggregates consisting of flocculated spindle-shaped primary particles were confirmed. Further, when the particle diameter was measured by using a digimatic caliper, the average diameters of primary particles were 1.0 μm in long diameter and 0.2 μm in short diameter, and the average particle diameter of the aggregates was 4.5 μm.

Example 2

Massive calcined lime having a hydrochloric acid activity (value at 3 minutes) of 300 mL was subjected to wet slaking with water to prepare a calcium hydroxide slurry having a calcium hydroxide concentration of 149 g/L. Subsequently, this calcium hydroxide slurry was placed in a reactor, and a reaction was performed at reaction start temperature of 35° C. with blowing in carbon dioxide containing gas ($CO_2$ concentration: 30%) at a rate of 10 L/min. When the carbonation rate became 75%, the supply of the carbon dioxide containing gas was discontinued to terminate the reaction, and the reaction mixture was added with 10% by weight of calcium hydroxide slurry having a calcium hydroxide concentration of 149 g/L based on the amount of the reaction mixture.

Then, a reaction at the second stage was performed in the same manner as in Example 1 to obtain calcium carbonate. When the shape of this calcium carbonate was observed by using an electron microscope, a laser particle size analyzer and an X-ray powder diffractometer, aggregates consisting of flocculated spindle-shaped primary particles were confirmed. Further, when the particle diameter was measured by using a digimatic caliper, the average diameters of primary particles were 0.8 μm in long diameter and 0.15 μm in short diameter, and the average particle diameter of the aggregates were 4.6 μm.

Comparative Example 1

A carbonation reaction at the first stage was performed in the same manner as in Example 2, and, when the carbonation rate became 45%, the supply of the carbon dioxide containing gas was discontinued to terminate the reaction. The reaction mixture was added with 10% by weight of a calcium hydroxide slurry having a calcium hydroxide concentration of 149 g/L based on the amount of the reaction mixture, a reaction at the second stage was performed at reaction start temperature of 35° C. with further blowing in carbon dioxide containing gas. After the reaction, dehydration and classification were performed to obtain calcium carbonate. The shape of this calcium carbonate was observed by using an electron microscope, a laser particle size analyzer and an X-ray powder diffractometer.

Comparative Examples 2 and 3

Carbonation reactions at the first stage were performed in the same manner as in Example 1, and, when the carbonation rates became 91% and 100%, the supply of the carbon dioxide containing gas was discontinued to terminate the reaction.

The reaction mixture was added with 10% by weight of a calcium hydroxide slurry having a calcium hydroxide concentration of 100 g/L based on the amount of the reaction mixture, and a reaction at the second stage was performed at reaction start temperature of 61° C. with further blowing in carbon dioxide containing gas. After the reaction, dehydration and classification were performed to obtain calcium carbonate. The shape of this calcium carbonate was observed by using an electron microscope, a laser particle size analyzer and an X-ray power diffractometer.

The following physical properties of the calcium carbonates obtained in Examples 1 and 2 and Comparative Examples 1 to 3 were determined. The results are shown in Table 1 with the results of the aforementioned observation by using an electron microscope.

1. BET specific surface area ($m^2/g$): Measured by using Flow Sorb II 2300 (Micromeritics)
2. Median diameter (μm): Measured by using Laser Scattering Particle Size Distribution Analyzer (LA-920: Horiba, Ltd.)
3. Pore volume: Measured by using TriStar 3000 (Micromeritics)
4. Particle aggregation property: Observed by using electron micrographs of 3500 magnifications. The occurrence rates of flocculated spindle-shaped primary particles were rated as "⊚" for 90% or higher, as "○" for 70% or higher, as "Δ" for 50% or higher, and as "x" for lower than 50%.
5. Particle distribution: Observed by using Laser Scattering Particle Size Distribution Analyzer. The frequencies of particle diameter of 3 to 9 μm of were rated as "⊚" for 80% or higher, as "○" for 70% or higher, as "Δ" for 50% or higher, and as "x" for lower than 50%.

TABLE 1

| | Example 1 | Example 2 | Comparative Example 1 | Comparative Example 2 | Comparative Example 3 |
|---|---|---|---|---|---|
| BET specific surface area ($m^2/g$) | 12.1 | 17.1 | 20.3 | 7.8 | 6.1 |
| Median diameter (μm) | 4.5 | 4.6 | 2.7 | 5.7 | 5.6 |
| Pore volume (cc/g) | 2.3 | 2.4 | 1.8 | 1.3 | 0.8 |
| Particle aggregation property | ⊚ | ○ | Δ | Δ | X |
| Particle distribution | ⊚ | ○ | Δ | Δ | ○ |

From the results in Table 1, it was found that calcium carbonates of the Examples were found to have superior particle aggregation property as well as a large BET specific surface area and a large pore volume.

Examples 3 and 4 and Comparative Examples 4 to 6

By using calcium carbonates obtained in Examples 1 and 2 and Comparative Examples 1 to 3, papermaking materials were prepared with the following prescription. Paper having a basis weight of about 63 $g/m^2$ was made with these papermaking materials by using a square sheet machine under conditions of 3.5 kg/cm for 3 minutes and dried at 95° C. for 3 minutes to obtain a loaded paper.

<Papermaking Materials>

| | |
|---|---|
| Pulp (Laubholz Bleached Kraft Pulp, LBKP) | 100% |
| Calcium carbonate | 5% |
| Band | 0.50% |
| Cation starch | 0.50% |
| Sizing agent (alkyl ketene dimer, AKD) | 0.10% |
| Yield improver (polyacrylamide, PAM) | 0.02% |

The results of the measurement of paper quality and physical properties of each of the obtained loaded papers are shown in Table 2. The paper quality (basis weight, ash content, paper thickness, density, breaking length and Stockigt sizing degree) in Table 2 was determined in accordance with JIS. Brightness was measured in conformity with ISO3688, and opacity was measured in conformity with JIS P8136.

TABLE 2

| | Example 3 | Example 4 | Comparative Example 4 | Comparative Example 5 | Comparative Example 6 |
|---|---|---|---|---|---|
| Basis weight (g/m²) | 63.8 | 63.6 | 63.5 | 63.3 | 63.2 |
| Ash content (%) | 15 | 15 | 15 | 15 | 15 |
| Paper thickness (μm) | 134 | 135 | 132 | 131 | 126 |
| Density (g/m³) | 0.476 | 0.471 | 0.481 | 0.483 | 0.502 |
| Stockigt sizing degree (sec) | 23 | 21 | 5 | 18 | 25 |
| Breaking length (km) | 3.22 | 3.19 | 2.92 | 3.23 | 3.48 |
| Brightness (%) | 88.4 | 88.6 | 87.9 | 87.5 | 87.2 |
| Opacity (%) | 91.1 | 91.3 | 90.6 | 89.7 | 89.1 |

From the results in Table 2, it was found that the loaded papers obtained in the examples achieved greater paper thickness, lower density and higher bulk than those of the comparative examples even though the ash content was identical. Further, the loaded papers of the examples were excellent in mechanical strength and physical properties such as brightness and opacity, which were comparable or superior to those of the comparative examples.

According to the present invention, calcium carbonate aggregates having a large BET specific surface area and a large pore volume can be provided by using a high concentration calcium hydroxide slurry as raw material and performing a reaction consisting of the first stage at which a carbonation reaction is performed until the carbonation rate becomes high and the second stage at which the reaction is performed with further adding a calcium hydroxide slurry. Paper with superior brightness and opacity as well as high bulk can be provided by using such calcium carbonate aggregates.

The invention claimed is:

1. Precipitated calcium carbonate comprising secondary particles having a secondary particle diameter of 1 to 10 μm, each secondary particle consisting of flocculated primary particles of spindle-shaped calcium carbonate having a long diameter of 0.5 to 3.0 μm, a short diameter of 0.1 to 1.0 μm and an aspect ratio of 3 or more,
    wherein the secondary particles have a BET specific surface area in the range of from 8 to 20 m²/g and a pore volume in the range of 1.5 to 3.5 cm³/g.

2. A method for producing the precipitated calcium carbonate as defined in claim 1, wherein, in a first stage, carbon dioxide or carbon dioxide containing gas is blown into a calcium hydroxide slurry having a calcium hydroxide concentration of 100 to 400 g/L obtained by wet slaking calcined lime whose 4 N hydrochloric acid activity at 3 minutes is adjusted to 150 to 400 mL for reaction until the carbonation rate is 50 to 85%, then 1 to 20% by volume of the calcium hydroxide slurry is added, and carbon dioxide or carbon dioxide containing gas is then introduced to initiate a second stage of the reaction to produce the precipitated calcium carbonate.

3. A filler for loading paper, which contains the precipitated calcium carbonate according to claim 1.

4. A loaded paper, which contains the filler for loading paper according to claim 3.

5. A loaded paper, which contains 5 to 50 parts by weight of the filler for loading paper according to claim 3 based on pulp material as 100 parts by weight.

* * * * *